United States Patent
Matsueda

(10) Patent No.: US 7,540,361 B2
(45) Date of Patent: Jun. 2, 2009

(54) ROLLER BRAKE MOUNTING ADAPTER

(75) Inventor: Keiji Matsueda, Sakai (JP)

(73) Assignee: Shimano Inc., Osaka (JP)

( * ) Notice: Subject to any disclaimer, the term of this patent is extended or adjusted under 35 U.S.C. 154(b) by 42 days.

(21) Appl. No.: 11/390,119

(22) Filed: Mar. 28, 2006

(65) Prior Publication Data

US 2007/0017755 A1    Jan. 25, 2007

(30) Foreign Application Priority Data

Jun. 17, 2005    (JP) .............................. 2005-177231

(51) Int. Cl.
*F16D 65/10*    (2006.01)

(52) U.S. Cl. ............................ 188/218 R; 188/206 R; 301/6.6

(58) Field of Classification Search ............... 188/18 A, 188/18 R, 206 R, 218 A, 218 R; 301/6.6, 301/6.7, 105.1; 310/67 A
See application file for complete search history.

(56) References Cited

U.S. PATENT DOCUMENTS

| | | | | |
|---|---|---|---|---|
| 1,816,643 | A * | 7/1931 | Forsyth | 301/63.109 |
| 5,890,567 | A * | 4/1999 | Pete et al. | 188/218 R |
| 5,961,416 | A * | 10/1999 | Shoge | 475/297 |
| 6,559,564 | B1 * | 5/2003 | Itou | 310/67 A |
| 2004/0079612 | A1 * | 4/2004 | Endo et al. | 192/217 |

FOREIGN PATENT DOCUMENTS

| | | | |
|---|---|---|---|
| EP | 194551 | A2 * | 9/1986 |
| EP | 0 688 713 | A2 | 12/1995 |
| EP | 0 795 460 | A2 | 9/1997 |
| EP | 1 510 448 | A1 | 3/2005 |
| JP | 2596533 | Y2 | 3/1995 |
| JP | 2597742 | Y2 | 3/1995 |
| JP | 2002-220081 | A | 8/2002 |
| JP | 2003-81173 | A | 3/2003 |
| JP | 2004-10006 | A | 1/2004 |
| JP | 2004-10007 | A | 1/2004 |
| JP | 2004-11889 | A | 1/2004 |
| JP | 2004-11891 | A | 1/2004 |
| JP | 2004-25941 | A | 1/2004 |

* cited by examiner

*Primary Examiner*—Xuan Lan Nguyen
(74) *Attorney, Agent, or Firm*—Global IP Counselors, LLP

(57) ABSTRACT

The roller brake mounting adapter is configured to be mounted to a bicycle wheel driving device (e.g., hub) equipped with an internal motor. The roller brake mounting adapter has a flange part and a cylindrical part. The flange part is configured to be mounted to a side end section of a hub shell of the hub. The cylindrical part has a first contact surface and a second contact surface. The first contact surface is provided on an internal circumferential surface of the cylindrical part, and configured to contact a bearing serving to rotatably support the hub shell on a shaft of the hub. The second contact surface is provided on an external circumferential surface of the cylindrical part, and has protrusions that are spaced apart in a circumferential direction. The second contact surface is configured to contact a brake drum of the roller brake device.

7 Claims, 6 Drawing Sheets

ROLLER BRAKE MOUNTING ADAPTER

CROSS-REFERENCE TO RELATED APPLICATIONS

This application claims priority under 35 U.S.C. § 119 to Japanese Patent Application No. 2005-177231. The entire disclosure of Japanese Patent Application No. 2005-177231 is hereby incorporated herein by reference.

BACKGROUND OF THE INVENTION

1. Field of the Invention

The present invention relates to an adapter for mounting a roller brake to a hub. More particularly, the present invention relates to a roller brake mounting adapter for mounting a roller brake to a bicycle hub equipped with an internal motor.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In recent years, bicycles equipped with a motor or the like are becoming increasingly popular to supplement the power imparted by pedaling (motor-assisted bicycles). Particularly in China, there is a marked increase in the popularity of electric powered bicycles that have an electric motor built into a hub of a wheel. These electric motors are configured either to assist with the rotation of the wheels or to drive the rotation of the wheels altogether such that the bicycle moves forward even if the rider does not pedal.

One conventional bicycle that uses a hub equipped with an internal motor (hereinafter called "motor-equipped hub") is disclosed in Japanese Laid-Open Patent Publication No. 2004-25941. In this publication, a conventional motor-equipped hub comprises a hub axle and a casing to protect the hub axle. The casing comprises a stationary casing that is fixed to the hub axle and a hub shell (rotary drum) that covers the hub axle. Brake shoes of an internal expanding drum brake device are provided on the stationary casing. A brake drum for the internal expanding drum brake device is fixed to a cylindrical part formed so as to protrude from a bearing supported portion of the hub shell.

Such electric power bicycles are heavier because they require an electric motor and a battery serving as a power source. They can also travel at higher speeds than regular (non-motorized) bicycles because they are driven or assisted by the electric motor. Even though the inertia forces of electric powered bicycles are higher than those of normal (non-electric powered) bicycles, the electric powered bicycles are equipped with the same general-purpose brakes as regular bicycles, e.g., internal expanding drum brakes, band brakes, cantilever brakes, etc.

The roller brake has been known for some time as a bicycle brake providing a large braking force. A roller brake basically comprises a stationary bracket, a cylindrical brake drum, a plurality of brake shoes, a force applying member, a plurality of rollers and a brake operating unit. The stationary bracket is typically fastened to the frame of a bicycle. The cylindrical brake drum has a braking surface on an internal circumferential surface thereof, and is non-rotatably mounted to a hub of the bicycle. The brake shoes are arranged so as to be non-rotatable with respect to the stationary bracket, and have contact surfaces configured to contact the braking surface of the brake drum for applying braking action against the brake drum. The force applying member is configured and arranged to apply forces against the brake shoes in a radially inward direction. The rollers are arranged with spaces therebetween in a circumferential direction. The brake operating unit is configured to press the brake shoes against the brake drum. The brake operating unit has a cam mechanism configured to turn and thereby push the rollers radially outward.

When installing a roller brake onto a hub, the brake drum is first mounted to the hub. Then, the brake shoes, the force applying member, and the brake operating unit, which are already set on the stationary bracket, are mounted to the hub shaft with the stationary bracket being secured such that it cannot rotate. Finally, the stationary bracket is fastened to the hub shaft with a nut.

Since the roller brake is configured such that the rollers can press the brake shoes against the brake drum in a uniform fashion, a stronger braking force can be obtained than with conventional internal expanding drum brakes, band brakes, or other drum brakes that apply pressure to only a portion of the brake drum. As a result, the portion of the hub where the brake drum is mounted must be made to have a higher degree of strength than the hubs used in conventional brakes. Also, since the thickness of a roller brake in the axial direction (i.e., along the axial direction of the hub shaft) is larger than the thickness of a conventional brake, it is necessary to secure extra space in order to install a roller brake.

Installing a roller brake on a motor-equipped hub is problematic because there is not enough space and, even if there was enough space, it would not be acceptable to install the roller brake in the normal fashion because the transmitted torque would be insufficient and there would be issues regarding strength.

In view of the above, it will be apparent to those skilled in the art from this disclosure that there exists a need for an improved roller brake mounting adapter. This invention addresses this need in the art as well as other needs, which will become apparent to those skilled in the art from this disclosure.

SUMMARY OF THE INVENTION

One object of the present invention is to provide an adapter that enables a roller brake to be installed on a hub equipped with a built-in (internal) motor.

The foregoing object can basically be attained by providing a roller brake mounting adapter that is capable of being mounted to a bicycle hub equipped with an internal motor. The roller brake mounting adapter basically comprises a flange part and a cylindrical part. The flange part is configured to be mounted to a side end section of a hub shell of a bicycle hub equipped with an internal motor. The cylindrical part is formed integrally with the flange part. The cylindrical part includes a first contact surface and a second contact surface. The first contact surface is provided on an internal circumferential surface of the cylindrical part and configured to contact a bearing that rotatably supports the hub shell on a shaft of the hub. The second contact surface has a plurality of protrusions that are spaced apart in a circumferential direction on an external circumferential surface of the cylindrical part and configured to contact a brake drum of a roller brake.

When this adapter is mounted to the motor-equipped hub, the flange part is mounted to the side end section of the hub shell. Then the brake drum of the roller brake can be mounted to the second contact surface. Meanwhile, the bearing can be installed against the first contact surface. With this roller brake mounting adapter, the flange part and cylindrical part constitute the adapter. Since the second contact surface of the cylindrical part is provided with protrusions and recesses capable of carrying a large torque transmission, the adapter enables a roller brake to be easily mounted to a motor-equipped hub even if the roller brake is configured to exert larger braking forces than a conventional band brake.

In the roller brake mounting adapter in accordance with the second aspect of the present invention, the flange part is mounted to the side end section of the hub shell in such a manner that it can be detached and reattached. With this roller brake mounting adapter, maintenance of the hub and the roller brake can be accomplished more easily because the adapter can be detached and reattached.

In the roller brake mounting adapter in accordance with the third aspect of the present invention, the flange part is mounted to an inside surface of the side end section of the hub shell. With this roller brake mounting adapter, since the mounting portion of the adapter is hidden on the inside of the hub, the roller brake can be installed easily without the external appearance of the hub being affected by the presence of the adapter.

The roller brake mounting adapter in accordance with the fourth aspect of the present invention is the same as the roller brake mounting adapter in accordance with the second aspect but with the additional requirement that at least a portion of the first contact surface is arranged further to the inside than an outside surface of the side end section of the hub shell. With this roller brake mounting adapter, since at least a portion of the shaft bearing is arranged farther to the inside than an outside surface of the side end section of the hub shell, radially oriented forces acting on the bearing can be more readily imparted.

The roller brake mounting adapter in accordance with the fifth aspect of the present invention is the same as the roller brake mounting adapter in accordance with the third aspect but with the additional requirement that at least a portion of the first contact surface is arranged further to the inside than an outside surface of the side end section of the hub shell. With this roller brake mounting adapter, since at least a portion of the shaft bearing is arranged farther to the inside than an outside surface of the side end section of the hub shell, radially oriented forces acting on the bearing can be more readily imparted and additional space can be secured for mounting the roller brake.

In the roller brake mounting adapter in accordance with the sixth aspect of the present invention, at least a portion of the second contact surface is arranged further to the outside than the first contact surface. With this roller brake mounting adapter, since the roller brake is arranged farther to the outside than the bearing support surface, it is easier to mount the roller brake to the second contact surface by providing a wider second contact surface.

In the roller brake mounting adapter in accordance with the seventh aspect of the present invention, the flange part is configured such that it can be fastened to the hub shell with a screw-threaded member inserted from outside the hub shell. With this roller brake mounting adapter, since a screw-threaded member can be installed from the outside, the hub shell can be fastened with ease using a screw-threaded member(s).

With the present invention, the flange part and cylindrical part constitute the adapter. Since the second contact surface of the cylindrical part is provided with protrusions and recesses capable of carrying a large torque transmission, the adapter enables a roller brake to be easily mounted to a motor-equipped hub even if the roller brake is configured to exert larger braking forces than a conventional band brake.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
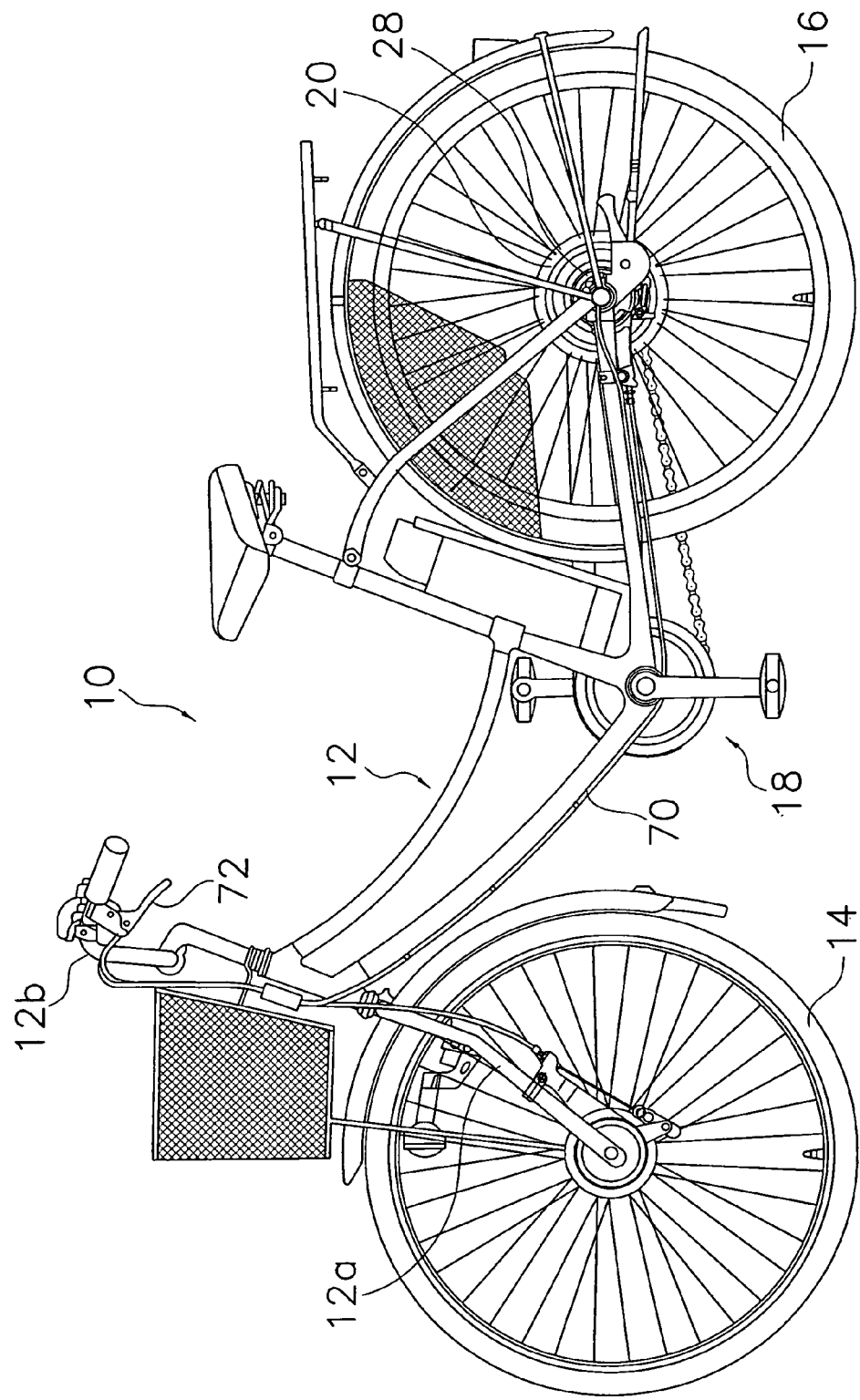
FIG. 1 is a side elevational view of a bicycle that is equipped with a motor-equipped hub in accordance with a first embodiment of the present invention.

Referring initially to FIG. 1, a bicycle 10 is illustrated that is equipped in accordance with a first embodiment of the present invention. The bicycle 10 includes among other things a frame 12 with a front fork 12a, a front wheel 14, a rear wheel 16 and a manually powered drive train 18. The front and rear wheels 14 and 16 are arranged on the front and rear of the frame 12 with the manually powered drive train 18 arranged to drive the rear wheel 16 using human power. The manually powered drive train 18 includes one or more front sprockets, one or more rear sprockets, a chain and a crank set. A motor-equipped hub 20 (also referred to as the "bicycle wheel driving device" herein) is installed at the center of the rear wheel 16 for driving the rear wheel 16 using an electric motor.

Figure 2:
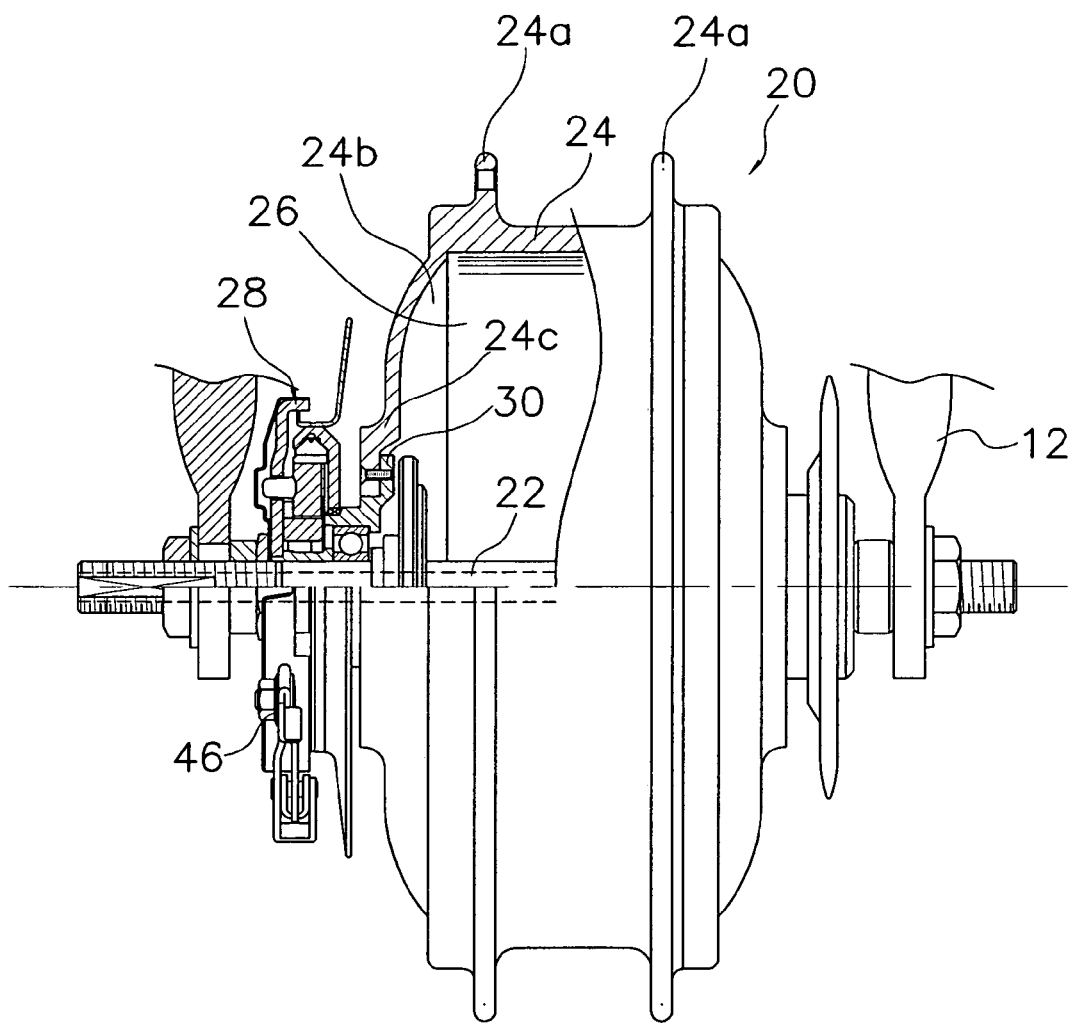
FIG. 2 is a front elevational view of the motor-equipped hub with a portion cut-away for purposes of illustration.
Figure 3:
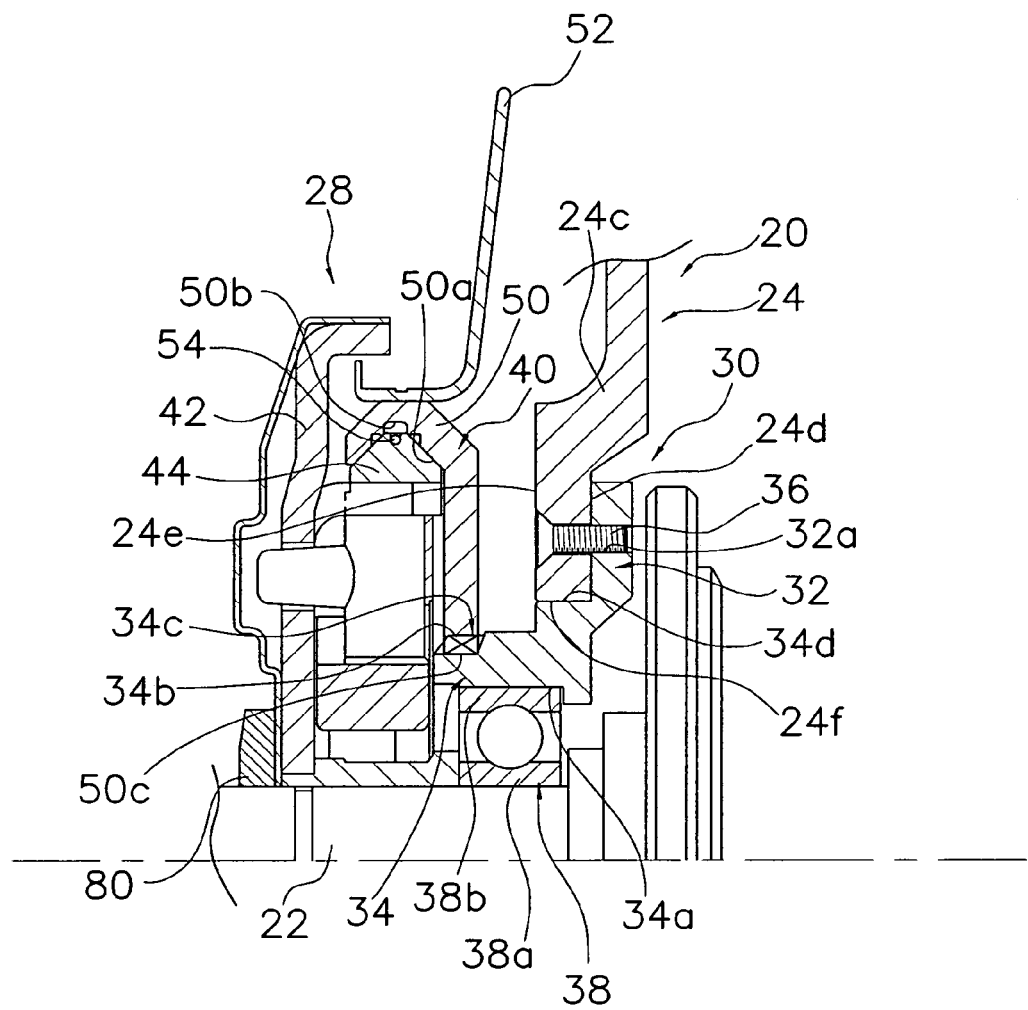
FIG. 3 is an enlarged partial cross sectional view of the motor-equipped hub in the vicinity of the roller brake mounting adapter.

As shown in FIG. 2, the motor-equipped hub 20 basically includes a hub shaft or axle 22, a hub shell 24, an electric motor drive unit 26 and a roller brake device 28. The hub axle 22 is configured and arranged such that it can be mounted to a rear end part of the frame 12 of the bicycle 10. The hub shell 24 has a pair of hub flanges 24a on the external circumference thereof, a housing space 24b on the inside thereof, and a first side end section 24c. The first side end section 24c has an inside surface 24d and an outside surface 24e with an internal circumferential surface 24f formed between the inside and outside surfaces 24d and 24e. The hub shell 24 is configured and arranged to be disposed around the outside of the hub axle 22 such that the hub axle 22 extends axially through the housing space 24b. The electric motor 26 is configured and arranged within the hub shell 24 to rotate with respect to the hub axle 22 in a conventional manner. The roller brake device 28 is attached to side end section 24c of the hub shell 24. As seen in FIG. 3, a roller brake mounting adapter 30 is used to mount the roller brake device 28 to the rear wheel 16 of the bicycle 10 in accordance with an embodiment of the present invention. In particular, the roller brake mounting adapter 30 is mounted to the side end section 24c of the hub shell 24 to attach the roller brake device 28 to the hub shell 24.

Figure 4:
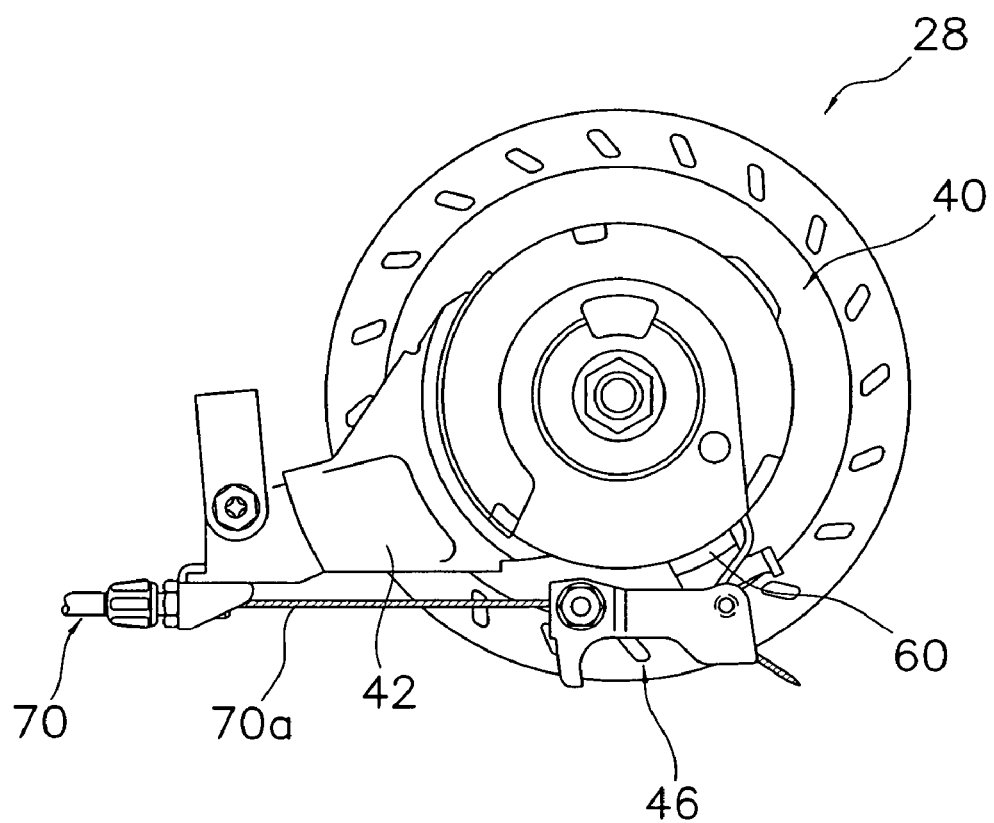
FIG. 4 is a side elevational view of the roller brake device mounted to the motor-equipped hub.
Figure 5:
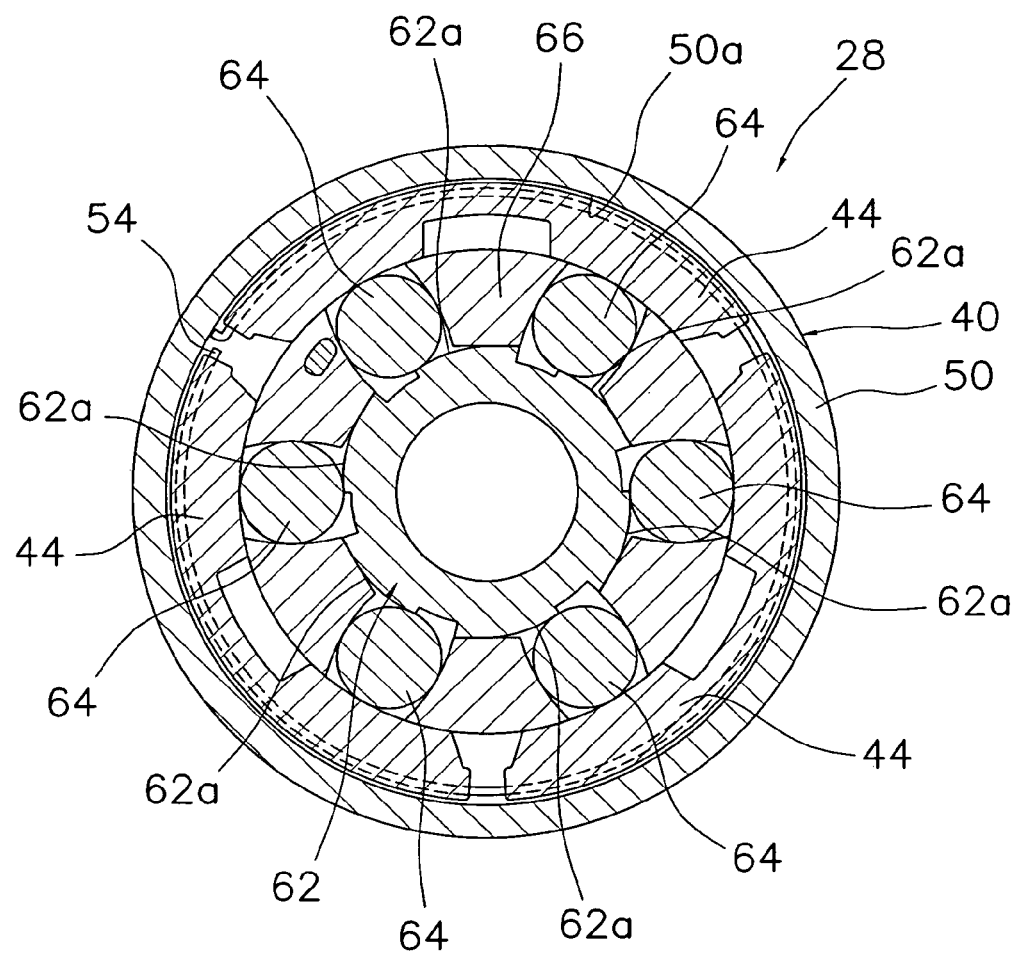
FIG. 5 is a transverse cross sectional view of the roller brake device showing the inside of a roller brake device.

As shown in FIGS. 3 to 5, the roller brake device 28 includes a brake drum 40, a stationary bracket 42, plurality (three) of brake shoes 44, and a brake operating unit 46. The stationary bracket 42 is mounted non-rotatably to the frame 12. The brake shoes 44 are configured and arranged to press against the brake drum 40 and apply braking action. The brake operating unit 46 is configured to press the brake shoe 44 against the brake drum 40.

As shown in FIG. 3, the roller brake mounting adapter 30 is mounted such that it can rotate the brake drum 40 of the roller brake device 28 integrally therewith. The adapter 30 is a flanged cylindrical member comprising a flange part 32 and a cylindrical part 34. The flange part 32 is configured to be mounted to the inside surface 24d of the side end section 24c of the hub shell 24. The cylindrical part 34 is formed integrally with the flange part 32. The flange part 32 is provided with a plurality of screw-threaded holes 32a that are spaced apart from each other in a circumferential direction and formed to be parallel to the hub axle 22. The flange part 32 is fastened to the inside surface 24d by installing a plurality of flathead screws 36 into the threaded holes 32a from the outside surface 24e of the side end section 24c of the hub shell 24.

The cylindrical part 34 has a first contact surface 34a, a plurality of protrusions 34b forming recesses on a second contact surface 34c and a third contact surface 34d. The first contact surface 34a is provided on an internal circumferential surface of the cylindrical part 34 and configured to contact a bearing 38 that rotatably supports the hub shell 24 on the hub axle 22. The second contact surface 34c is provided on an external circumferential surface of the cylindrical part 34. The protrusions 34b on the second contact surface 34c are spaced apart in a circumferential direction. The protrusions 34b are configured to contact the brake drum 40 of the roller brake device 28. The third contact surface 34d of the cylindrical part 34 is configured to contact the internal circumferential surface 24f of the side end section of the hub shell 24.

The first contact surface 34a contacts an outer race 38b of the bearing 38, which also has an inner race 38a that is mounted onto the hub axle 22. At least a portion of the first contact surface 34a is arranged farther to the inside than the outside surface 24e of the side end section 24c of the hub shell 24. As a result, radially oriented forces acting on the bearing 38 are more readily imparted.

The second contact surface 34c is arranged on the external circumference of an outside end section of the cylindrical part 34 such that a portion thereof is positioned farther to the outside than the first contact surface 34a and another portion overlaps the first contact surface 34a in the radial direction. The protrusions 34b of the second contact surface 34c comprise serrations, splines, or other protrusions that have a width of, for example, 1 to 3 mm and that are spaced apart from one another in the circumferential direction. The protrusions 34b are configured to mesh with the internal circumferential surface of the brake drum 40, and serve to cause the brake drum 40 to rotate integrally with the hub axle 22.

The third contact surface 34d is formed on a portion of the external circumference of the cylindrical part 34 adjacent to the flange part 32 and has a larger diameter than the second contact surface 34c. The third contact surface 34d is provided so that the hub shell 24 can be arranged on the adapter 30 in such a fashion as to be concentric with respect to the hub axle 22. When the hub shell 24 and adapter 30 are installed such that the third contact surface 34 mates with the internal circumferential surface 24f of the side end section 24c, the hub shell 24 is arranged concentrically with respect to the hub axle 22.

As shown in FIG. 3, the brake drum 40 can rotate integrally with the hub shell 24. The brake drum 40 includes a ring-shaped drum main body 50 and a cooling disk 52. The ring-shaped drum main body 50 has a braking surface 50a on a first internal circumference section and a plurality of protrusions 50c on a second internal circumference section. The cooling disk 52 is fastened to the external circumference of the drum main body 50. The braking surface 50a is configured such that the middle section thereof is recessed in the general shape of an isosceles trapezoid, the width thereof narrowing as one moves outward in the radial direction. Meanwhile, the radially outward facing surface of each of the brake shoe 44 is protruded in the general shape of an isosceles trapezoid. The protrusions 50c are formed on an internal circumferential surface of the drum main body 50 and serve to mesh with the protrusions 34b of the second contact surface 34c such that the drum main body 50 can rotate integrally with the cylindrical part 34. The most recessed portion of the braking surface 50a forms a grease filling groove 50b. The cooling disk 52 is preferably made of an aluminium alloy and is secured to the drum main body 50 by swaging or other joining method. The cooling disk 52 serves to cool the drum main body 50.

The stationary bracket 42 is mounted to the hub axle 22 and secured to the frame 12 in such a fashion as to prevent it from rotating. The stationary bracket 42 serves to prevent the brake shoe 44 from rotating and to pivotally support the brake operating unit 46. The stationary bracket 42 is mounted to the hub axle 22 with a fastening nut 80 screwed onto the hub axle 22.

The brake shoes 44 are arranged as a ring-shaped member that is divided into, for example, three sections. The brake shoes 44 are arranged so as to be prevented from rotating by the stationary bracket 42. The brake shoes 44 are spring loaded in a direction of separation from the braking surface 50a (radially inward direction) by a return spring 54. The return spring 54 is an annular spring member made of an elastic wire-like material that has been bent into a circular shape.

The brake operating unit 46 serves to press the brake shoe 44 against the braking surface 50a in opposition to the spring load force imposed by return spring 54 against the brake shoe 44. As shown in FIGS. 4 and 5, the brake operating unit 46 includes an operating arm 60 (FIG. 4), a cam member or mechanism 62, a plurality (e.g., six) of rollers 64, and a roller case 66. The operating arm 60 (FIG. 4) is mounted to the stationary bracket 42 in such a manner that it can rock freely. The cam mechanism 62 is configured and arranged to pivot integrally with the operating arm 60. The rollers 64 are arranged between the cam member 62 and the brake shoe 44 so as to touch both the cam member 62 and the brake shoe 44 and be spaced apart from one another in the circumferential direction. The roller case 66 is configured to hold the rollers 64 at the circumferential spacing.

The operating arm 60 is a member made of a metal plate-like material. An inner cable 70a of a brake cable 70 is connected to one end of the operating arm 60. The other end of the inner cable 70a is connected to a brake lever 72 (FIG. 1) mounted to a handlebar 12b. The cam member 62 has six (for example) slanted surfaces 62a on the external circumference thereof that serve to push the rollers 64 radially outward when the cam member 62 turns.

When the brake lever 72 is operated and the inner cable 70a is pulled (moved leftward when viewed from the perspective of FIG. 4), the operating arm 60 swings clockwise (from the perspective of FIG. 4) about the hub axle 22 and the cam member 62 turns integrally with the movement of the operating arm 60. As a result, the rollers 64 are moved radially outward and the brake shoe 44 is pressed against the braking surface 50a of the brake drum 40. When the brake lever 72 is released, the inner cable 70a returns to its original position and the operating arm 60 swings counterclockwise (from the perspective of FIG. 4). As a result, the pressing of the rollers 64 is released and the return spring 54 moves the brake shoe 44 radially inward away from the braking surface 50a.

When the roller brake mounting adapter 30 is installed by mounting it to the hub shell 24 using the screws 36, the first contact surface 34a and the second contact surface 34c are arranged on separate portions of the internal circumference and the external circumference, respectively, of the cylindrical part 34. The bearing 38 is installed against the first contact surface 34a and serves to rotatably support the hub shell 24 with respect to the hub axle 22.

When the roller brake device 28 is installed, the protrusions 50c of the drum main body 50 are meshed with the protrusions 34b of the second contact surface 34. As a result, the hub shell 24 and the brake drum 40 can rotate integrally (together as one). The roller brake device 28 is mounted to the hub axle 22 by screwing the fastening nut 80 onto the hub 22. Additionally, the tip end of the stationary bracket 42 is secured to the frame 12 to prevent the stationary bracket 12 from rotating. Installing the fastening nut 80 and securing the stationary bracket 42 completes the installation of the roller brake device 28.

Since the second contact surface 34c of the cylindrical part 34 is provided with the protrusions 34b, the adapter 30 enables the roller brake device 28 to be easily mounted to the motor-equipped hub 20 even if the roller brake device 28 is configured to exert larger braking forces than a conventional band brake.

Furthermore, since at least a portion of the first contact surface 34a is arranged farther to the inside than the outside surface 24e if the side end section 24c of the hub shell 24, at least a portion of the bearing 38 is arranged farther inward than the outside surface and radially oriented forces acting on the bearing 38 can be more readily imparted.

Other Embodiments

Figure 6:
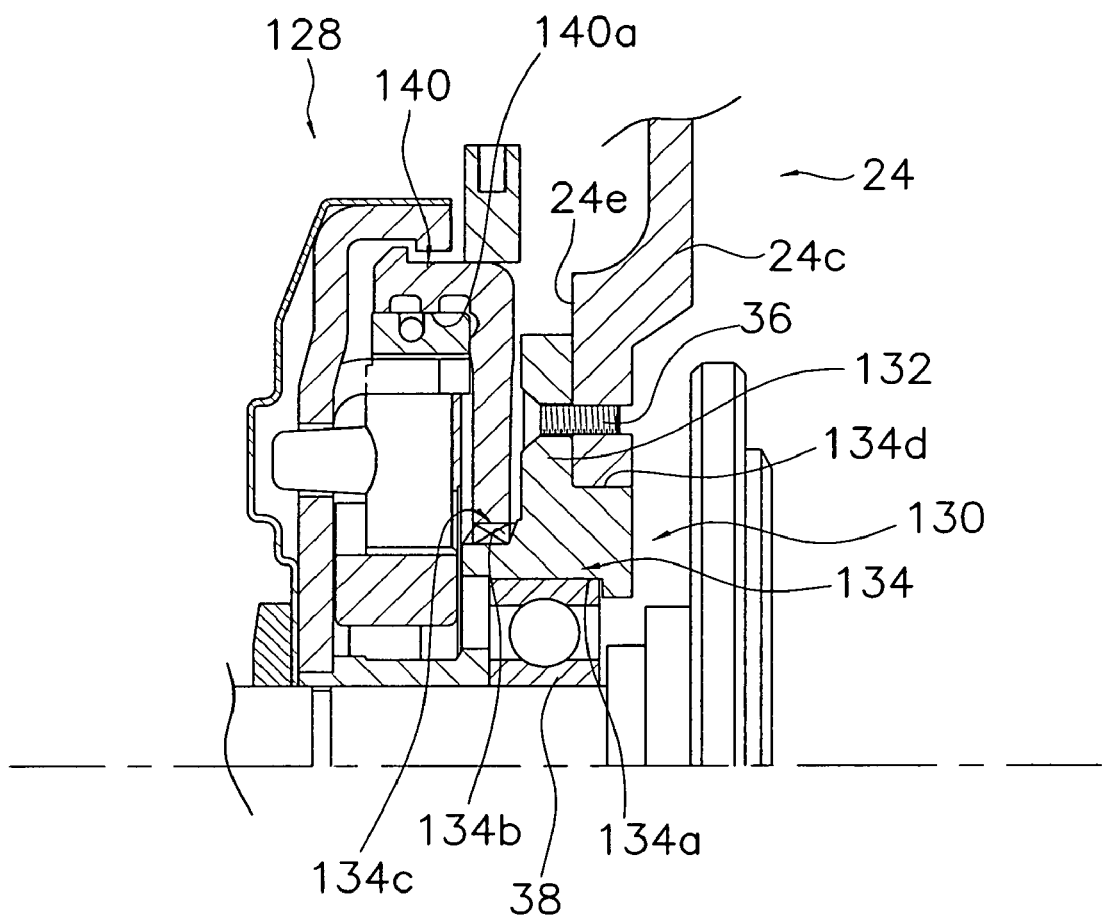
FIG. 6 is an enlarged partial cross sectional view, similar to FIG. 3, of the motor-equipped hub in the vicinity of the roller brake mounting adapter in accordance with another embodiment of the present invention.

Referring now to FIG. 6, a roller brake device 128 with a roller brake mounting adapter 130 is illustrated in accordance with a second embodiment. The roller brake device 128 is attached to the hub 24, which is discussed above, using the roller brake mounting adapter 130. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the first embodiment, the roller brake mounting adapter 30 is mounted to the inside surface 24d of the side end section 24c of the hub shell 24. However, as in this second embodiment, it is also acceptable to have the roller brake mounting adapter 130 that is mounted to the outside surface 24e of the side end section 24c with the screws 36, as shown in FIG. 6. The roller brake mounting adapter 130 has a flange part 132 and a cylindrical part 134 that extends to the left and right from the flange part 132. The flange part 132 is thus positioned generally in the middle of the roller brake mounting adapter 130 along the axial direction. A first contact surface 134a is formed on an internal circumferential surface of the cylindrical part 134, and a second contact surface 134c and a third contact surface 134d are formed on external circumferential surfaces of the cylindrical part 134 on opposite sides of the flange part 132. The shapes of these surfaces 134a, 134c and 134d are the same as the surfaces 34a, 34c and 34d as described in the first embodiment.

In the roller brake device 128 shown in FIG. 6, the brake drum 140 does not have a cooling disk and the braking surface 140a of the brake drum 140 is a flat (non-contoured) circular surface. Therefore, the radially outward facing surface of the brake shoe is also a flat circular surface. The other constituent features are the same as in the first embodiment.

Although the previously described embodiments presents a roller brake adapter that is mounted to a motor-equipped hub installed on a rear wheel, the present invention can also be applied to a roller brake adapter that is mounted to a motor-equipped hub installed on a front wheel.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle wheel driving device comprising:
   a hub axle;

a hub shell including a side end section having an internal circumferential surface with an inner diameter and a radially extending inside surface, the hub shell being rotatably disposed around the hub axle by at least one bearing; and a motor disposed inside the hub shell and configured to rotate the hub shell with respect to the hub axle; and a roller brake device coupled to the outside of the hub shell by a roller brake mounting adapter comprising a flange part extending radially outward within the hub shell and being non-rotatably mounted to the radially extending inside surface of the side end section of the hub shell, an outer end of the flange part having a first diameter; and a cylindrical part formed integrally with the flange part, the cylindrical part including an internal contact surface of the cylindrical part contacting the bearing, and first and second external contact surfaces of the cylindrical part, the first external contact surface extending outside of and away from the hub shell and having a plurality of circumferential spaced apart protrusions that are engaged with the roller brake device, the first external contact surface having a second diameter smaller than the first diameter, with the inner diameter of the side end section of the hub shell being smaller than the first diameter and larger than the second diameter, the second external contact surface axially extending from the flange part, mating with the internal circumferential surface of the side end section of the hub shell and radially outwardly supporting the internal circumferential surface of the side end section of the hub shell, with the first and second external contact surfaces being located at axial locations at least partially overlapping with the internal contact surface of the cylindrical part.

2. The bicycle wheel driving device as recited in claim 1, wherein the flange part is detachably and reattachably mounted to the side end section of the hub shell.

3. The bicycle wheel driving device as recited in claim 1, wherein at least a portion of the internal contact surface is arranged further to an inside than an outside surface of the side end section of the hub shell.

4. The bicycle wheel driving device as recited in claim 1, wherein at least a portion of the first external contact surface is arranged further to an outside than the internal contact surface with respect to an axial midpoint of the hub along the shaft of the hub.

5. A bicycle wheel driving device comprising:

a hub axle;

a hub shell including a side end section having an internal circumferential surface with an inner diameter, the hub shell being rotatably disposed around the hub axle by at least one bearing; and a motor disposed inside the hub shell and configured to rotate the hub shell with respect to the hub axle; and a roller brake device coupled to the outside of the hub shell by a roller brake mounting adapter comprising a flange part mounted to a radially extending inside surface of the side end section of the hub shell, and fastened to the hub shell with a screw-threaded member that is inserted from outside of the hub shell, the flange part having a first diameter, and a cylindrical part formed integrally with the flange part, the cylindrical part including an internal contact surface of the cylindrical part contacting the bearing, and first and second external contact surfaces, the first external contact surface having a plurality of circumferential spaced apart protrusions that are engaged with the roller brake device, the first external contact surface having a second diameter smaller than the first diameter, with the inner diameter of the side end section of the hub shell being smaller than the first diameter and larger than the second diameter, the second external contact surface axially extending from the flange part, mating with the internal circumferential surface of the side end section of the hub shell and radially outwardly supporting the internal circumferential surface of the side end section of the hub shell, with the first and second external contact surfaces being located at axial locations at least partially overlapping with the internal contact surface of the cylindrical part.

6. The roller brake mounting adapter as recited in claim 5, wherein the flange part is detachably and reattachably mounted to the side end section of the hub shell.

7. The roller brake mounting adapter as recited in claim 6, wherein at least a portion of the internal contact surface is arranged further to an inside than an outside surface of the side end section of the hub shell.

* * * * *